United States Patent [19]

Akahane et al.

[11] Patent Number: 5,537,874

[45] Date of Patent: Jul. 23, 1996

[54] ANGULAR ACCELERATION DETECTOR

[75] Inventors: Akira Akahane; Ivan Godler, both of Nagano-ken, Japan

[73] Assignee: Harmonic Drive Systems, Inc., Tokyo, Japan

[21] Appl. No.: 142,289

[22] PCT Filed: Mar. 26, 1993

[86] PCT No.: PCT/JP93/00370

§ 371 Date: May 5, 1994

§ 102(e) Date: May 5, 1994

[87] PCT Pub. No.: WO93/20451

PCT Pub. Date: Oct. 14, 1993

[30] Foreign Application Priority Data

Mar. 29, 1992 [JP] Japan .................................. 4-101877

[51] Int. Cl.$^6$ .............................. G01P 15/08; G01D 5/34
[52] U.S. Cl. ...................................... 73/514.04; 73/514.02; 250/231.14
[58] Field of Search ........................ 73/517 A, 494, 73/505, 517 R, 514.02, 514.04, 514.26; 356/373; 250/231.16, 231.15, 231.18, 231.14, 237 G, 231.13; 341/13, 31

[56] References Cited

U.S. PATENT DOCUMENTS

| 3,654,480 | 4/1972 | Stepenson | 250/231.13 |
| 4,077,266 | 3/1978 | Takamatsu | 73/514.04 |
| 4,767,925 | 8/1988 | Kawamoto | 250/231.16 |

FOREIGN PATENT DOCUMENTS

| 3-229120 | 10/1991 | Japan . |
| 3-255367 | 11/1991 | Japan . |
| 3-255369 | 11/1991 | Japan . |

Primary Examiner—Hezron E. Williams
Assistant Examiner—Christine K. Oda
Attorney, Agent, or Firm—Burns, Doane, Swecker & Mathis

[57] ABSTRACT

An angular acceleration detector (10) is provided with two slit-carrying discs (14, 15) mounted fixedly and coaxially in an opposed state on a rotary body (13), and a semiconductor position detecting unit (19) formed as a detecting means and consisting of a light emitting element (20) and a semi conductor position detecting member (21) which are disposed in an opposed state across the slits in these discs, the angular acceleration of the rotary body being detected by using this detecting unit. The slits (17) in the disc (15) cross at a predetermined angle the slits (16) in the disc (14). The disc (15) has an annular weight portion (15b) at the radially outer side of a slit-carrying portion thereof, and a resilient deformable spring portion (15c) circumferentially arranged at the inner side of the weight portion. The angular acceleration of the rotary body can be measured by detecting the movement of the crossing portions of the slits relative moving due to the inertial force of the weight portion.

13 Claims, 7 Drawing Sheets

CENTER

DETECTING AREA

ANGULAR ACCELERATION DETECTOR

TECHNICAL FIELD

The present invention relates to an angular acceleration detector which detects an angular acceleration of a rotary body such as a motor shaft and the like over an infinite range of rotational angle of the rotary body in a non-contact manner.

BACKGROUND ART

Conventionally, a liquid rotor-type tachometer and an eddy-current tachometer have been known as an angular acceleration detector for detecting an angular acceleration of a rotary body.

The liquid rotor-type tachometer, as shown in FIG. 15 in which the structure thereof is illustrated, detects movements of a liquid instead of those of the pendulum of a servo-type acceleration detector, and measures a value of a feedback electrical current applied to a servo system in order that the servo system realizes a balanced condition with respect to the movement of the liquid, to thereby determine an angular acceleration according to the measured feedback electrical current. More specifically, the liquid 2 is enclosed in a ring-shaped tube 1 and is partitioned by a paddle 3. When the tachometer itself begins to rotate, the liquid tends to stay at an absolute position and therefore the paddle dividing the liquid is angularly deflected by a force applied thereto. A deflection detector 4 detects this deflection and supplies a torquer with a feedback electrical current in order to return the paddle 3 toward a zero position. Since the value of the feedback electrical current is proportional to an amount of angular acceleration occurred, the occurred angular acceleration can be determined in accordance with the instant feedback electrical current.

On the other hand, as shown in FIG. 16, the eddy-current tachometer is constituted in that a permanent magnet is used to form a magnetic circuit and a cylindrical aluminum rotor is disposed in the circuit so that an angular acceleration is detected based on a magnetic electromotive force occurred in accordance with a change in rotational speed of the rotor.

However, since the liquid rotor-type tachometer is limited in a range of measuring rotational angle, it has a defect that it cannot detect a angular acceleration over an infinite rotational range. While, the eddy-current tachometer needs to be provided with a high-sensitive signal processing circuit because detected signals are extremely weak.

An object of the present invention is, in consideration of the above defects, to provide an angular acceleration detector capable of detecting a angular acceleration of a rotary body over an infinite rotational angle.

DISCLOSURE OF INVENTION

An angular acceleration detector of the present invention has two slit-carrying discs (first and second discs) mounted fixedly and coaxially in an opposed state on a rotary body, and a semiconductor position detecting unit formed as a detecting means and consisting, for instance of a light emitting element and a semiconductor position detecting member which are disposed in an opposed state across the slits in the respective discs, the angular acceleration of the rotary body being detected by using this detecting unit. The slits in the second disc cross at a predetermined angle the slits in the first disc. The second disc has an annular weight portion at the radially outer or inner side of a slit-formed portion, and a resiliently deformable spring portion circumferentially arranged at the inner side of the weight and slit-formed portions.

As the rotary body rotates, the two discs rotate together with the rotary body. During the rotation, the spring portion is deformed resiliently and slightly in a circumferential direction by the inertia force of the weight portion of the second disc in accordance with the change in rotational speed of the rotary body. As a result, the slits formed at the radially outer side of the spring portion are also moved slightly in the circumferential direction, so that the crossing portions of the slits of the second disc relative to those of the first disc moves according to the movements of the slits of the second disc. The movements of the crossing portions of the slits are detected by the semiconductor position detecting unit. The detected movement position (the amount of movement) corresponds to the angular acceleration of the rotary body. Therefore, the angular acceleration of the rotary body can be measured.

The weight portion of the second disc can be formed by increasing the thickness of this portion of the disc. A disc of constant thickness may be used to provide the weight portion.

In addition, the second disc may be made by a disc of a single material formed therein with the second slits and the weight portion, and, alternatively, it may be made such that these portions are formed in separate members, respectively, and these members are assembled integrally to constitute the second disc. With this constitution, it is advantageous that fine slits can easily be formed accurately by, for example, using a glass material to form the slit portion.

Next, the first and second slits may be formed so that they are inclined with each other. Especially, where the first slits are inclined by a predetermined angle relative to the radial direction of the disc and the second slits are inclined oppositely by the same angle relative to the radial direction, the center of gravity of the crossing portions of the first and second slits is moved circumferentially.

As the shape of the slits, although they may be of straight line, they are preferably of Archimedean spiral shape.

The detecting unit is preferably disposed circumferentially at a plurality of positions, whereby inaccurate disc attachment, inaccurate slit forming or the like can be compensated by using outputs of these detecting units.

As the first and second slits, those slits can be adopted that are arranged at a same interval but having a slight out-of-phase between them. In this case, the change in overlapping area of the first and second slits caused by the rotation of the rotary body is detected by the detecting unit, and based on the detected change, the angular acceleration of the rotary body can be determined.

BEST MODE FOR CARRYING OUT THE INVENTION

Examples of the present invention will now be described with reference to the drawings.

Figure 1:
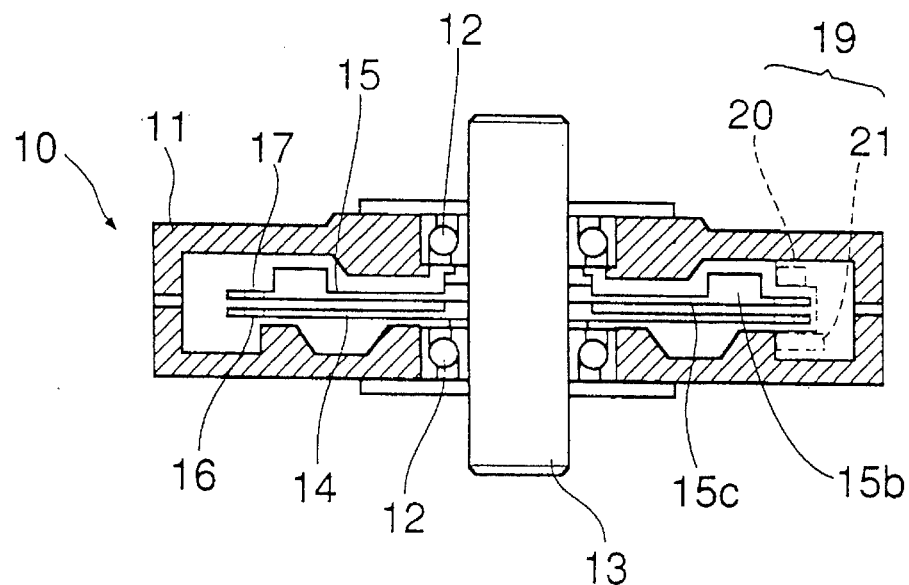
FIG. 1 a schematic sectional view showing the structure of an example of an angular acceleration detector according to the present invention.

FIG. 1 shows a cross section of an angular acceleration detector according to the present example. The angular acceleration detector 10 of the present example has an annular housing 11 and a rotary axis 13 to be measured which is disposed to pass through the center of the housing 11 in a manner that it is rotatably via a bearing 12. Two discs 14 and 15 are mounted fixedly in an opposed state on the outer surface of the rotary axis 13 disposed in the housing 11. These discs 14 and 15 are formed at their radially outer sides with slits 16 and 17 arranged circumferentially and evenly spaced. A semiconductor position detecting portion 19 of a semiconductor position detecting unit is disposed across the slits 16 and 17. The detecting portion 19 comprises a light emitting diode 20 and a semiconductor position detecting member 21.

Figure 2:
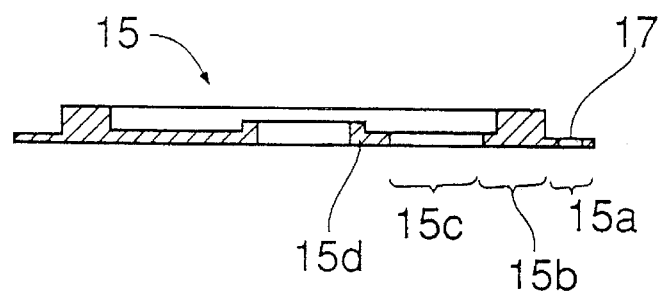
FIG. 2 is a sectional view showing the shape of a disc of the detector of FIG. 1.
Figure 3:
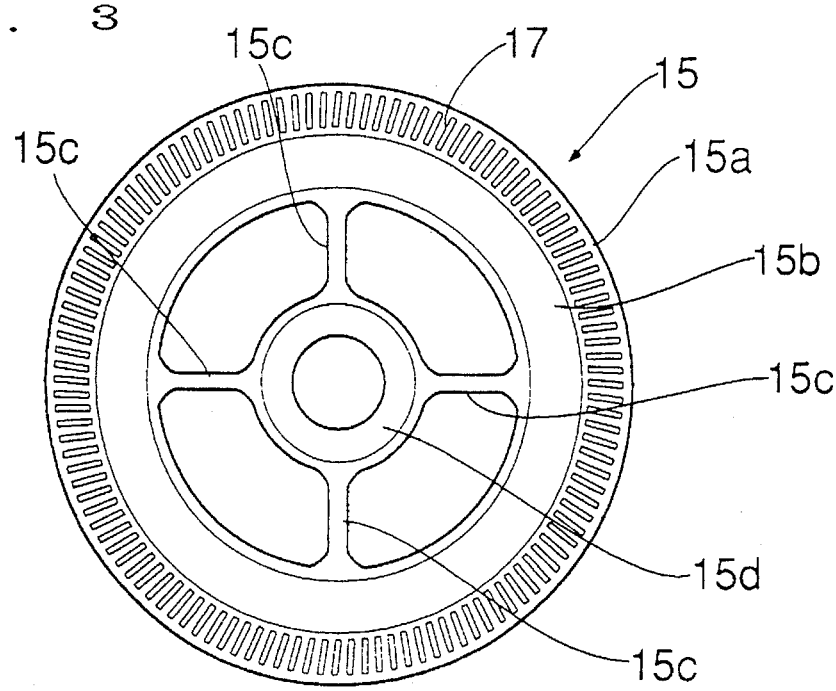
FIG. 3 is a plan view showing the shape of the disc of the detector of FIG. 1.

FIGS. 2 and 3 show the shape of the above disc 15. As shown in these Figures, the disc 15 of the present example has a thin annular portion 15a positioned at the radially outermost side thereof, in which the slits 17 are formed. A thick annular weight portion 15b is formed at the radially inner side of the thin annular portion 15a. The weight portion 15b is supported by ribes 15c extending at an equal angle of 90 degrees from the inner surface of the weight portion toward the center of the disc. The center sides of these ribs 15c are connected to and supported by the outer surface of a flange 15d fixed on the rotary axis 13. The ribs 15c are a spring portion resiliently deformable in the circumferential direction. The characteristic of the spring portion is adjusted by varying the thickness, width and the number of the ribs. While, the other disc 14 is a rigid disc generally having a constant thickness.

Next, the slits 16 and 17 formed in the discs 14 and 15 will be explained. The slits 15 formed in the disc 14 are those formed at an equal space and extending radially. On the other hand, the slits 17 formed in the disc 15 are those formed at the same pitch but extending in the direction inclined by a predetermined angle from the radial direction.

Figure 4:
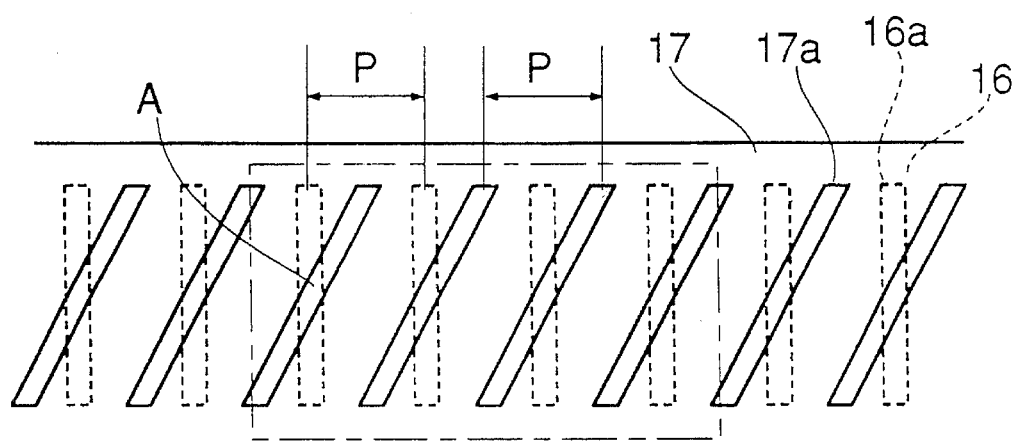
FIG. 4 illustrates the relationship between the slits of the detector of FIG. 1.

FIG. 4 illustrates the slits 16 and 17 in a manner that they are expanded in the lateral direction from the circumferential direction. In the drawing, the slits shown by dotted lines are the slits 44 formed in the disc 14, while those shown by solid lines are the slits 15 formed in the disc 15. An area defined by a phantom line is a detecting area of the position detecting member 21. The slits 16 are composed of a plurality of slits 16a arranged an a pitch p, whereas the other slits 17 are composed of a plurality of slits 17a inclined by an predetermined angle relative to the slits 16a. The crossing or overlapping portions A of the slits 16a and 17a define light-path portions. As the respective slits 16a and 17a are moved laterally relative to each other, the crossing portions A move vertically as a whole. The moved positions of the portions A are detected by the semiconductor position detecting member 21.

Figure 5:
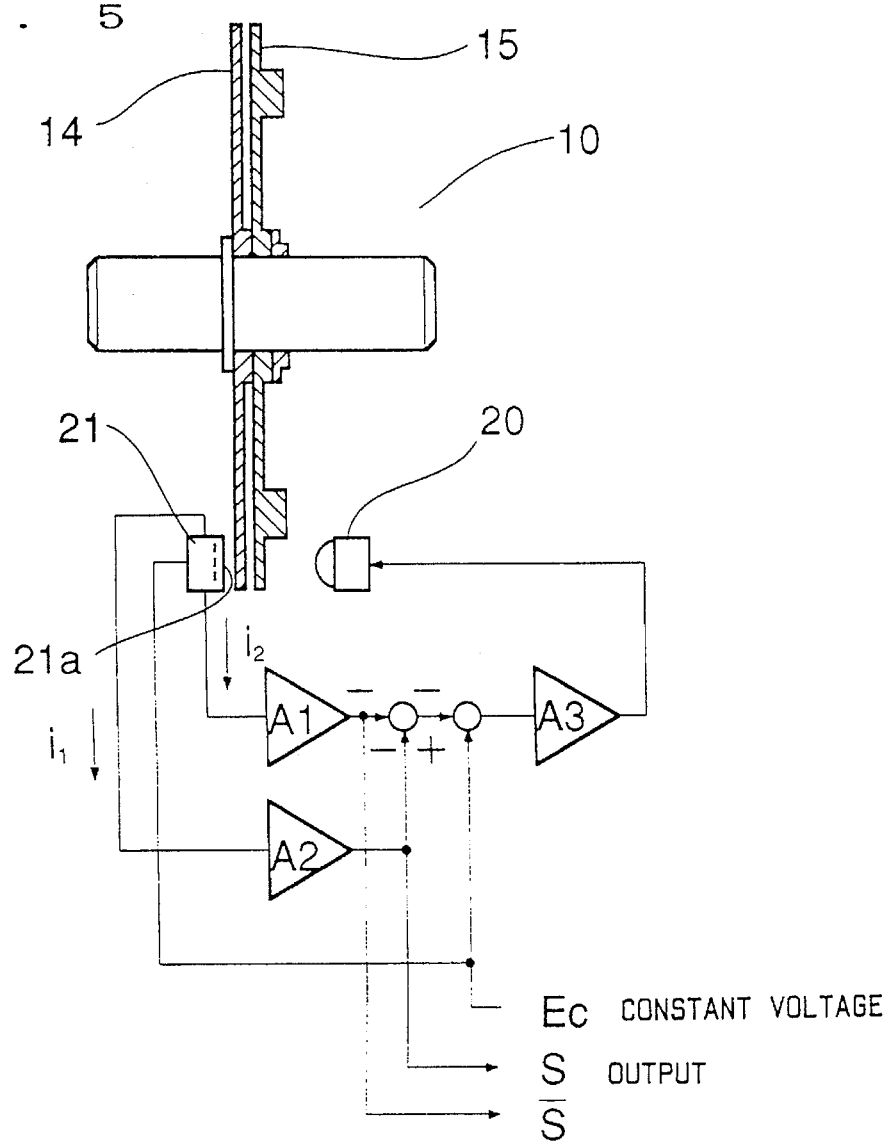
FIG. 5 is a block diagram showing a control system of the detector of FIG. 1.

FIG. 5 shows a controlling system of the angular acceleration detector 10 of the present example. Parallel lights from the light emitting diode 20 passes through the crossing portions A and are applied on the detecting surface 21a of the semiconductor position detecting member 21, so that photoelectric output i1 and i2 divided by a ratio according to the irradiation position of the lights are generated from the detecting member 21. In the present example, the amount of light emitted from the light emitting diode 20 is controlled so that the sum of the outputs i1 and i2 is maintained to be constant, and therefore the moved positions of the portions A can be measured according to the outputs of the detecting member 21.

In the angular acceleration detector 10 of the present example as constituted above, when the rotary axis 13 begins to rotate or when the rotational speed of the rotary axis changes, the slits 17 of the disc 15 deviated circumferentially relative to the slits 16 of the other disc 14. That is, due to the inertia force of the annular weight portion 15b formed in the disc 15, the spring portion 15d thereof resiliently deformed in the circumferential direction, so that the slits 17 are also deviated accordingly. As a result, the crossing portions (light-path portions) A formed between the slits 16 and 17 are deviated radially. Therefore, the light receiving position (the center of gravity of light) of the semiconductor position detecting unit 21 is also moved. By the movement of the light receiving position, the outputs of the detecting member 12 are varied. Thus, the angular acceleration of the rotary axis 13 can be measured according to the outputs of the detecting member.

For reference, an example of method of designing the angular acceleration detector 10 of the present example will be explained. First, provided that the maximum angular displacement in response to a given maximum angular acceleration δm (rad/s$^2$) is defined by φm (rad). Where the inertia moment of the detector is J, and a spring constant of the spring portion of the disc 15 is k, a torque generated by the acceleration is $$Tm = \delta m \cdot J$$

and that generated by the displacement of the spring portion is $$Tm = \phi m \cdot k$$

Since the both torques are equal in an stationary or constant rotating condition, $$\delta m \cdot J = \phi m \cdot k$$

A ratio of k to J is obtained from the above equation.

$$k/J = \delta m/\phi m$$

The ratio (k/J) is proportional to a square of the mechanical natural frequency.

$$k/J = \omega_n^2$$

For instance, provided that an acceleration which is capable of increasing the rotational speed from 0 rpm to 3000 rpm within a period of 10 msec is adopted as the maximum angular acceleration. In this case, $$\begin{aligned}\delta m &= (\omega 1 - \omega 0)/\Delta t \\ &= [(3000 - 1)/0.01] \cdot 2\pi/60 \\ &= 31416 \text{ (rad/s}^2)\end{aligned}$$

Provided that the maximum angular displacement is one minute, $$\phi m = (1/60) \cdot (\pi/180) = 2.91 \times 10^{-4} \text{ (rad)}$$

Thus, the ratio of k to J becomes $$k/J = \delta m/\phi m = 31416/(2.91 \times 10^{-4}) = 1.08 \times 10^8 \text{ (1/s}^2)$$

The natural frequency becomes $$\begin{aligned}\omega_n &= (k/J)^{1/2} \\ &= 10392 \text{ (rad/s)} = 1654 \text{ Hz}\end{aligned}$$

Accordingly, the band width required for the detector can be defined by the maximum angular acceleration and the maximum angular displacement. The inertia moment J and the spring constant k can be set so as to satisfy the obtained ratio of k/J.

In the present example, the disc 15 is formed with four ribs 15c. Alternatively, three or more than four ribs may be formed at an equal angle. The number of the ribs is determined according to a spring constant required. Typically, the number of ribs is set three to twelve. In addition, in the present example, the disc 14 is formed therein with the slits extending radially, while the disc 15 is formed therein with the slits inclined so as to cross the slits of the disc 14. In opposite to this, the slits extending radially may be formed in the disc 15 and the inclined slits may be formed in the disc 14. In addition, although the discs 14 and 15 are formed at their outer most sides in the above example, the slits can be formed at their inner sides. For instance, in the disc 15, the slits 17 can be formed at the inner side of the weight portion 15b, and the slits 16 can be formed at a portion of the disc 14 facing the slits.

Shape of the weight portion

Figure 6A:
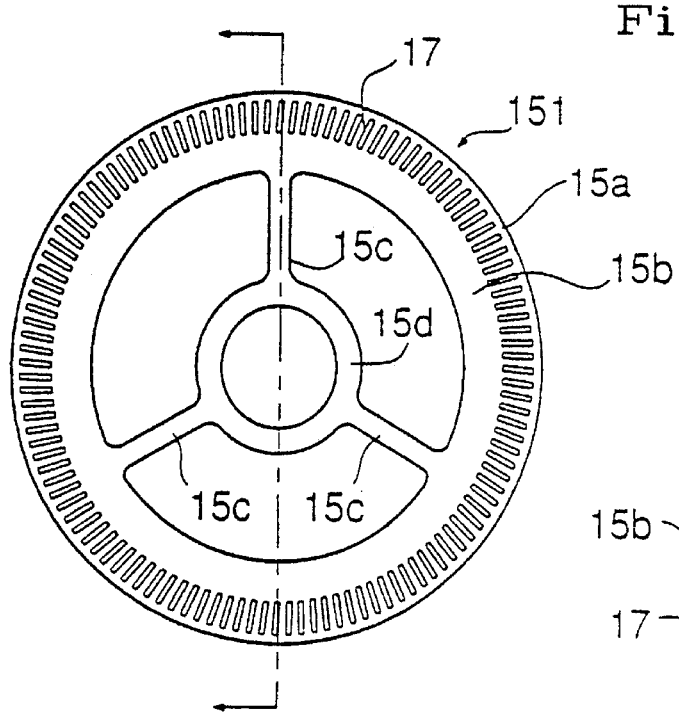
FIGS. 6(A) and 6(B) are a plan view and a sectional view, respectively, showing a disc having an another shape of cross section applicable for the present invention.
Figure 6B:
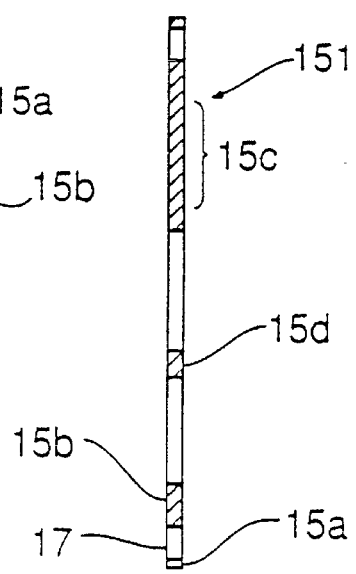

In the above example, the shape in section of the disc 15 where the weight portion 15b is set thick as shown in FIG. 2. Alternatively, as shown in FIGS. 6(A) and 6(B), the disc 15 can be made from a disc 151 of a constant thickness. In these Figures, the corresponding portions to those of FIGS. 2 and 3 are denoted by the same reference numerals. The disc 151 is formed with three ribs arranged at an equal angular interval. The disc 151 has portions 15a and 15b which function as the weight portion. Where the disc of a constant thickness is used, it has advantages that the disc can easily be made, the resilient characteristic of the disc can easily be adjusted and the like.

Structure of the disc

Figure 7A:
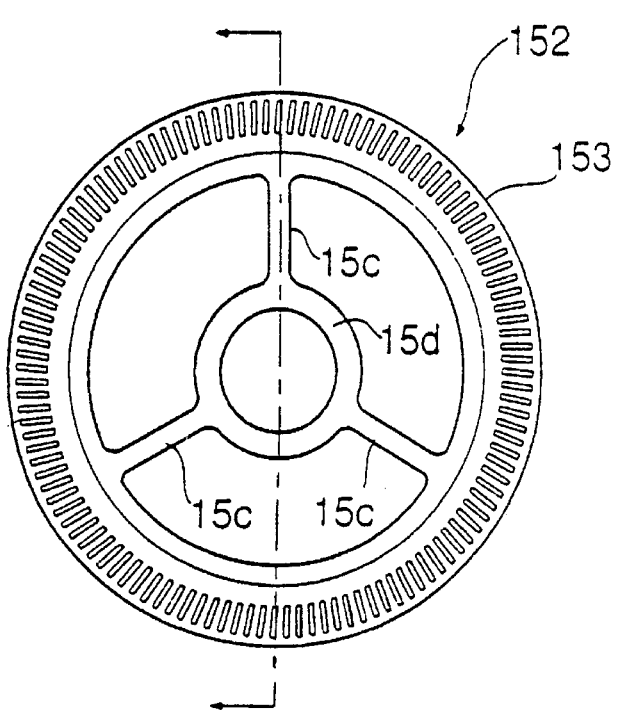
FIGS. 7(A) and 7(B) are a plan view and a sectional view, respectively, showing a disc of an another structure applicable for the present invention.
Figure 7B:
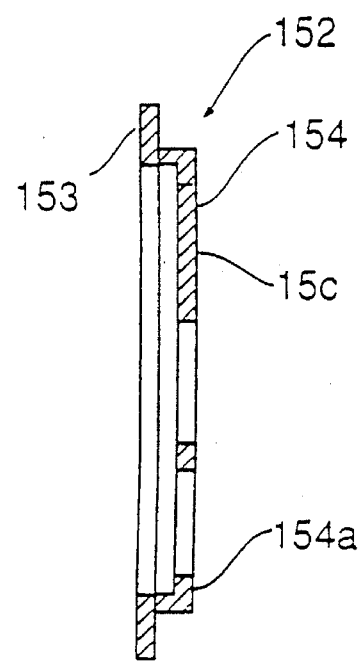

FIGS. 7(A) and 7(B) show an another example of the disc 15. The disc 152 shown in these Figures has an annular plate 153 made of glass formed therein with slits 17, and an annular plate 154 made of metal fixedly and coaxially attached on the side of the annular plate 153. The annular metal plate 154 has an outer circumferential portion 154a functioning as a weight portion, this portion being connected via three ribs 15c to the flange portion 15d fixedly mounted on the rotary member to be measured (not shown).

As mentioned above, according to the disc 152 of the present example, since the glass material which can easily be formed therein with fine slits accurately is used to form a slit-carrying portion, the detecting accuracy can be enhanced. In addition, since the metal material is used to form the weight and spring portions, these portions can be made easily. As the material for the slit-carrying portion, ceramics, plastics and the like other than glass may be used. The metal materials include aluminum, steel, stainless steel, nickel and the like. Further, the weight and spring portions may also be made from plastics or ceramics. When assembling different materials, it is needed to consider the difference in thermal coefficient of expansion between these materials.

Figure 8:
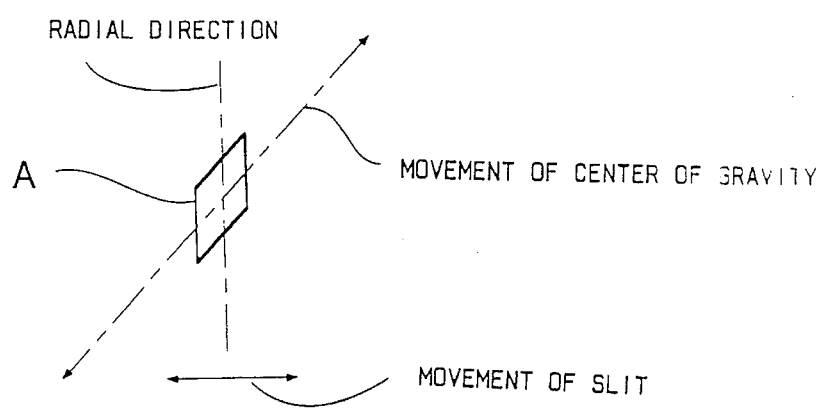
FIG. 8 illustrates the shape of the crossing portion (overlapping portion) of the slits in the detector of FIG. 1.

Inclination of the slits

Where each slit of either one of the slits 16 or 17 is inclined by a predetermined angle relative to the radial direction as shown in FIG. 4, the crossing portions (light passing portions) A of the parallelgram-like shape are defined as shown in FIG. 8. When the slits move relatively, the center of gravity of the light passing through each of the crossing portions moves as shown by a dotted line in FIG. 8.

Figure 9:
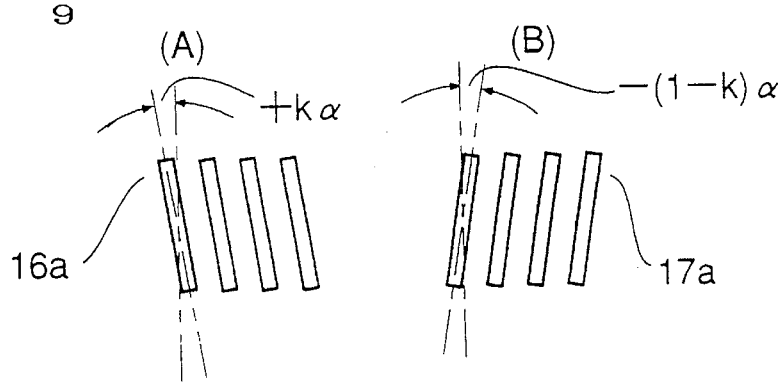
FIGS. 9(A) and 9(B) illustrate slits inclined oppositely relative to each other, which are applicable for the present invention.
Figure 10:
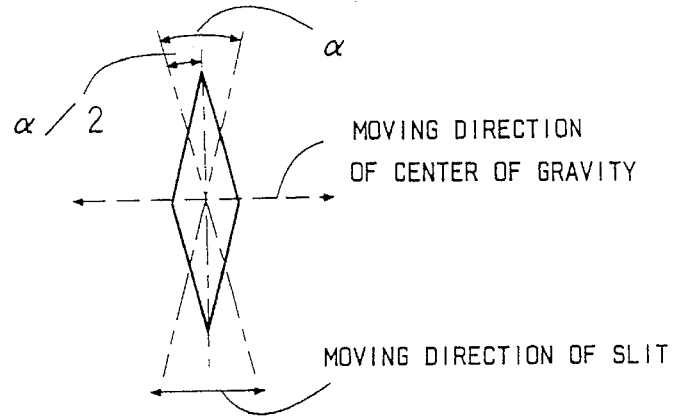
FIG. 10 illustrates the shape of the crossing portion (overlapping portion) formed by the slits of FIG. 9.

On the other hand, where both of the slits 16a and 17a are inclined oppositely by a predetermined angle α/2 (in the drawing, k=½) relative to the radial direction, the crossing portion of the slits is of diamond shape as shown in FIGS. 9(A) and 9(B). As a result, as the both slits move relatively, the center of gravity of the light passing through the crossing portion moves circumferentially. Thus, by inclining the slits oppositely, a merit can be obtained in that the center of gravity of the light passing through the crossing portion does not move radially.

Shapes of the slits

Figure 11:
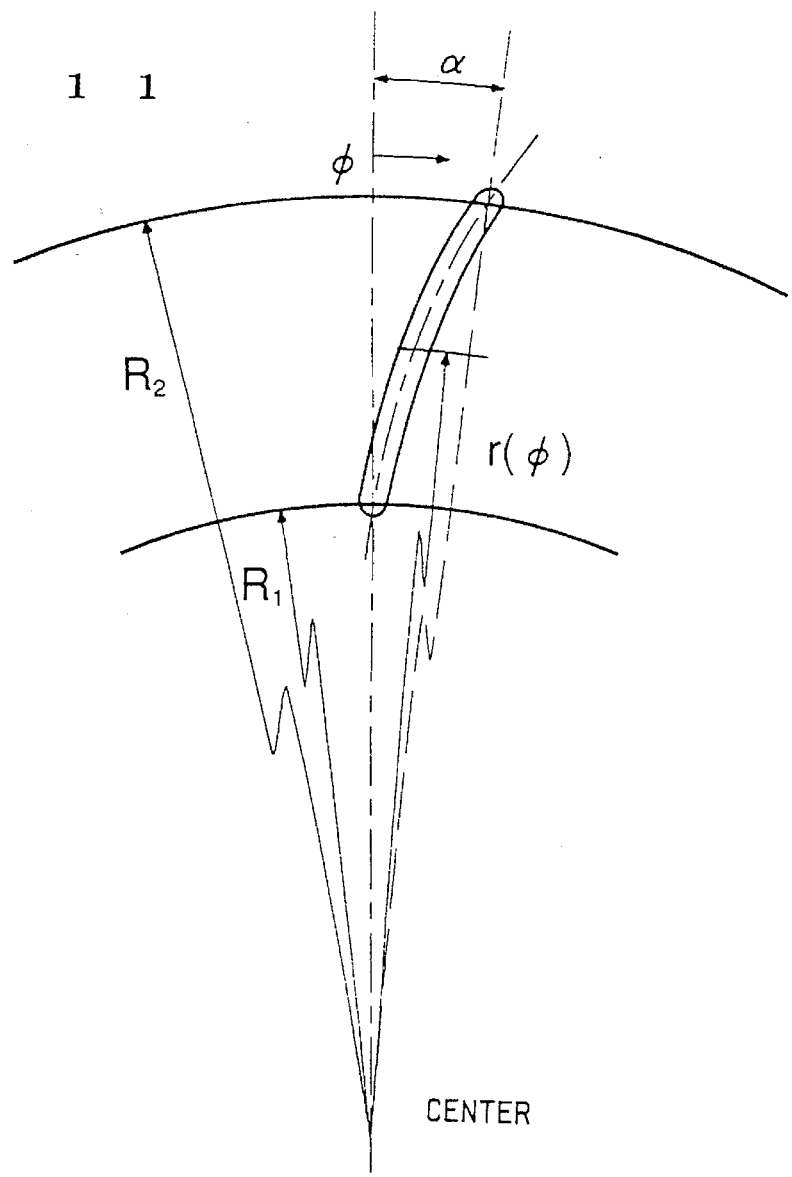
FIG. 11 illustrates slits of an another shape applicable for the present invention.

In the examples aforementioned, the respective slits 16a and 17a are of straight shape having a constant width. Instead of this, as shown in FIG. 11, Archimedean spiral can be adopted. The slit according to this curve has a center line, a radius r(φ) of which is defined by the following expression.

$$r(\phi) = R2 - R1)\phi/\alpha + R1$$

where

R2: A radius of the outer side of the slit

R1: A radius of the inner side of the slit

φ: Angle

α: Pitch angle r(φ): A radius of the center line defining the shape of the slit

By adopting this curve for the shape of the slit, the sensitivity of the detector can be maintained constant irrespective of angular deviations of the discs.

Disposition of the detector

Figure 12:
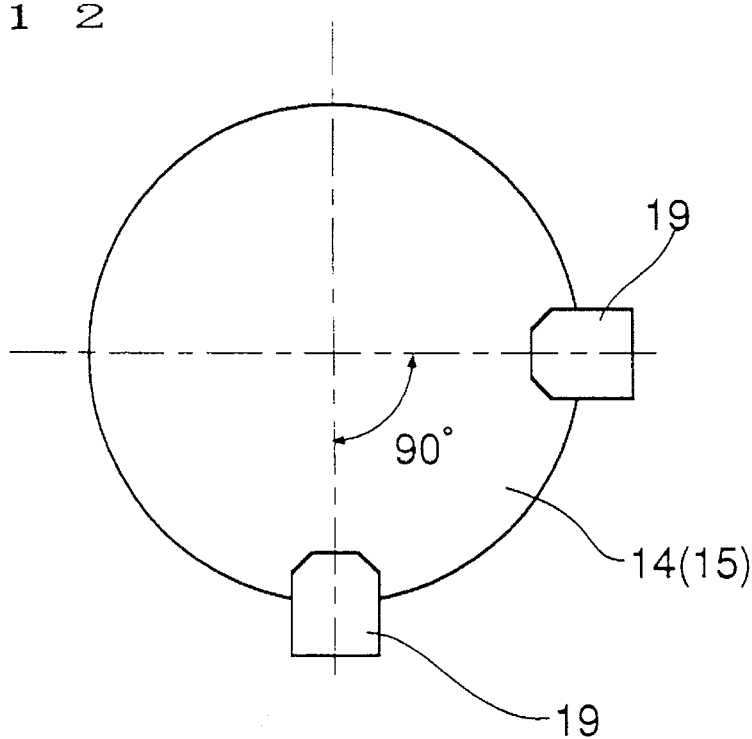
FIG. 12 illustrates an example of disposition of detecting units.
Figure 13:
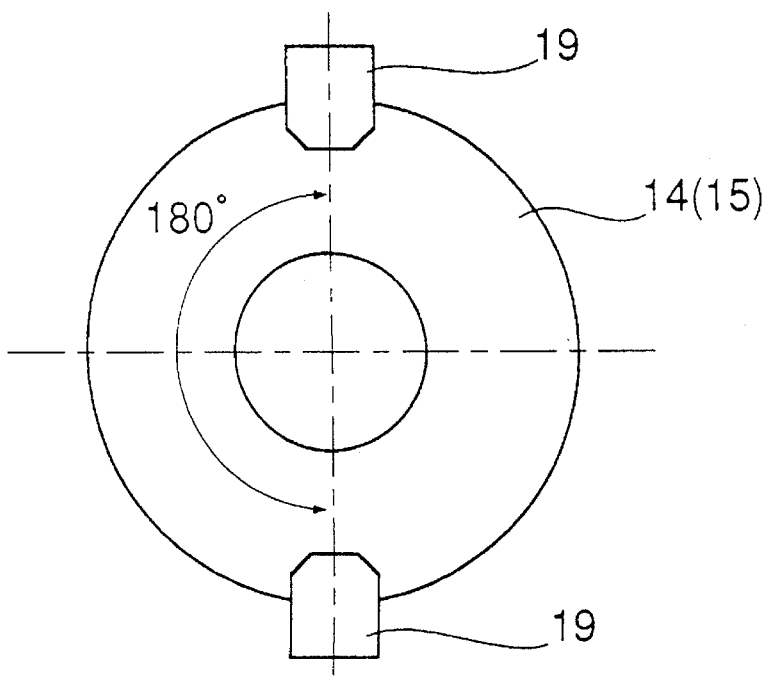
FIG. 13 illustrates an another example of disposition of detecting units.
Figure 15:
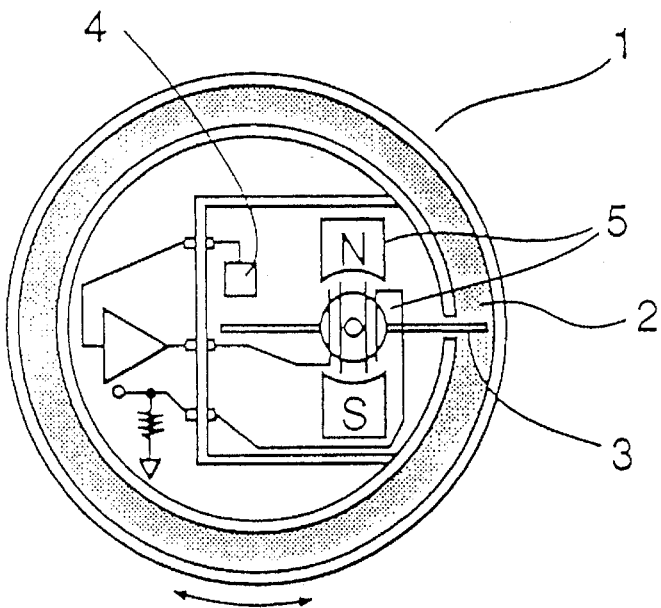
FIG. 15 illustrates a conventional angular acceleration detector.
Figure 16:
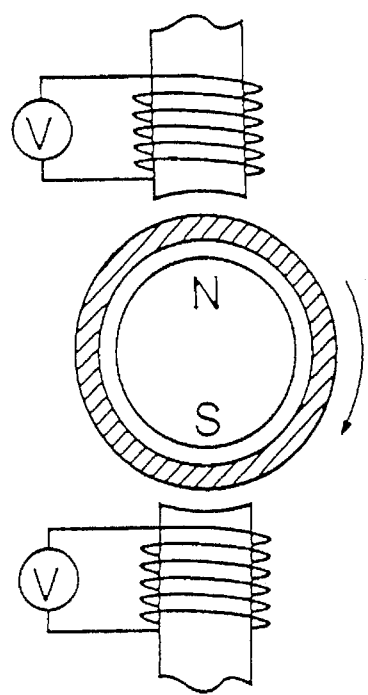
FIG. 16 illustrates an another angular acceleration detector of the conventional type.

It is preferable to provide two detecting members for detecting the light passed through the slit-crossing portion arranged at an interval of 90 degrees or 180 degrees as shown in FIGS. 12 and 13. With these arrangements, the detecting inaccuracy caused by an inaccuracy of disc attachment, slit deviation or the like can be compensated by using the outputs of these detecting members.

Another example

Figure 14:
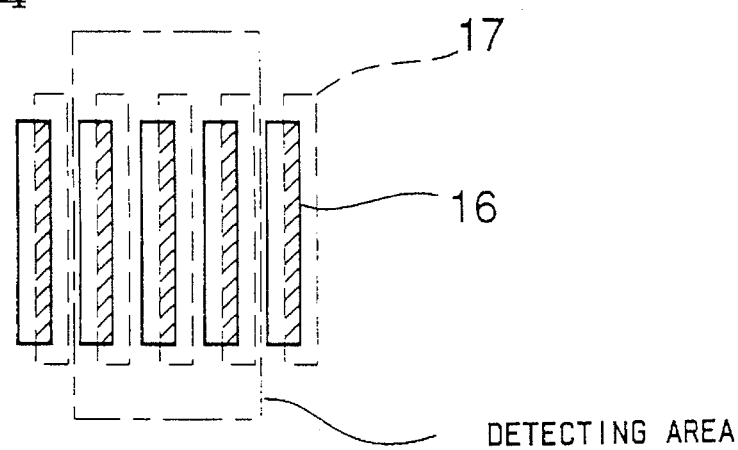
FIG. 14 illustrates a main portion of an another example of the present invention.

FIG. 14 shows a main portion of an another example according to the present invention. In the present example, the discs 14 and 15 are formed therein with slits 16 (shown by solid lines in the drawing) and slits 17 (shown by dotted lines in the drawing), the slits 16 and 17 being arranged equally spaced but having a slight out-of-phase between them. When the slits are moved relative to each other, the amount of light passing through the crossing portion defined by the slits is changed. Based on the change in the amount of light, an angular acceleration of the rotary body to be measured can be detected. The remaining portions of the present example are the same as those of the aforementioned examples, and therefore the explanation thereof is deleted.

Industrial Applicability

As mentioned above, according to the the angular acceleration detector of the present invention, two slit-carrying discs are fixedly mounted on the rotary body to be measured, the slits formed in one of the discs are resiliently deviated circumferentially in response to the angular acceleration of the rotary body, and the deviation of the slits is detected by the detecting means, whereby the angular acceleration of the rotary body is measured. According to the present invention, with an simple structure, the angular acceleration of the rotary body can be detected over an infinite range of rotational angle of the rotary body.

We claim:

1. An angular acceleration detector comprising: a first disc mounted coaxially and fixedly on a rotary body so as to rotate integrally therewith; a second disc arranged opposite to said first disc and mounted coaxially and fixedly on said rotary body so as to rotate integrally therewith; first slits formed circumferentially in said first disc at a predetermined interval; second slits formed circumferentially in a portion of said second disc facing said first slits which extend in a direction crossing said first slits at a first predetermined angle; an annular weight portion formed at at least a radially inner side of a slit-formed portion of said second disc where said second slits are-formed; a spring portion resiliently deformable in a circumferential direction which is formed at a radially inner side of said slit-formed and weight portions of said second disc; and a detecting means for detecting a change in position of crossing portions of said second slits with respect to said first slits, said change occurring by rotation of said rotary body; and where in an angular acceleration of said rotary body is determined based on a detection of said detecting means.

2. An angular acceleration detector according to claim 1, wherein said second disc is of a constant thickness.

3. An angular acceleration detector according to claim 1, wherein said second disc is a composite disc in which said slit-formed portion and said spring portion are made of different materials with respect to each other.

4. An angular acceleration detector according to claim 1, wherein said first slits are inclined from a radial direction of said first disc by a second predetermined angle, and said second slits are inclined oppositely by the second predetermined angle.

5. An angular acceleration detector according to claim 1, wherein at least either one of said first and second slits are shaped along the Archimedean spiral.

6. An angular acceleration detector according to claim 1, wherein said detecting means comprises a light emitting element and a semiconductor position detecting member across said first and second slits, and wherein said detecting means detects the center of gravity of a light passing through said first and second slits.

7. An angular acceleration detector comprising: a first disc mounted coaxially and fixedly on a rotary body so as to rotate integrally therewith; a second disc arranged opposite to said first disc and mounted coaxially and fixedly on said rotary body so as to rotate integrally therewith; first slits formed circumferentially in said first disc at a predetermined interval; second slits formed circumferentially in a portion of said second disc facing said first slits in a manner that the second slits are arranged at a predetermined interval and being out-of-phase relative to said first slits; an annular weight portion formed at at least one of a radially outer side and a radially inner side of a slit-formed portion of said second disc where said second slits are formed; a spring portion resiliently deformable in a circumferential direction which is formed at a radially inner side of said slit-formed and weight portions of said second disc; and a detecting means for detecting a change in an overlapping area of said second slits with respect to said first slits, said change occurring by rotation of said rotary body; and wherein an angular acceleration of said rotary body is determined based on a detection of said detecting means.

8. An angular acceleration detector according to claim 7, wherein said second disc is of a constant thickness.

9. An angular acceleration detector according to claim 7, wherein said second disc is a composite disc in which said slit-formed portion and said spring portion are made of different materials with respect to each other.

10. An angular acceleration detector according to claim 7, wherein said detecting means is arranged at a plurality of positions in a circumferential direction of said first and second discs.

11. An angular acceleration detector according to claim 10, wherein said detecting means is arranged at a plurality of positions in a circumferential direction of said discs.

12. An angular acceleration detector comprising: a first disc mounted coaxially and fixedly on a rotary body so as to rotate integrally therewith; a second disc arranged opposite to said first disc and mounted coaxially and fixedly on said rotary body so as to rotate integrally therewith; first slits formed circumferentially in said first disc at a predetermined interval; second slits formed circumferentially in a portion of said second disc facing said first slits which extend in a direction crossing said first slits at a predetermined angle; an annular weight portion formed at at least a radially outer side of a slit-formed portion of said second disc where said second slits are formed; a spring portion resiliently deformable in a circumferential direction which is formed at a radially inner side of said slit-formed and weight portions of said second disc; and a detecting means for detecting a change in position of crossing portions of said second slits with respect to said first slits, said change occurring by rotation of said rotary body; and wherein an angular acceleration of said rotary body is determined based on a detection of said detecting means.

13. An angular acceleration detector according to claim 12, wherein said second disc is of a constant thickness.

* * * * *